(12) United States Patent
Yang et al.

(10) Patent No.: US 8,496,104 B2
(45) Date of Patent: Jul. 30, 2013

(54) EXTENDIBLE CONVEYOR SYSTEMS AND METHODS

(75) Inventors: Shenghong W. Yang, Plano, TX (US); Yuh-Jing Ho, Flower Mound, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 76 days.

(21) Appl. No.: 13/309,720

(22) Filed: Dec. 2, 2011

(65) Prior Publication Data

US 2012/0152699 A1 Jun. 21, 2012

Related U.S. Application Data

(60) Provisional application No. 61/419,385, filed on Dec. 3, 2010.

(51) Int. Cl.
*B65G 21/14* (2006.01)
(52) U.S. Cl.
USPC .......................................... 198/812; 198/588

(58) Field of Classification Search
USPC .................................. 198/812, 594, 595, 588
See application file for complete search history.

(56) References Cited

U.S. PATENT DOCUMENTS

| | | | | |
|---|---|---|---|---|
| 6,695,120 | B1 * | 2/2004 | Trammell | 198/375 |
| 6,889,813 | B1 * | 5/2005 | Trammell et al. | 198/346.3 |
| 7,469,782 | B2 * | 12/2008 | Hutton | 198/812 |
| 8,398,469 | B2 * | 3/2013 | Coers et al. | 198/812 |
| 2006/0260913 | A1 * | 11/2006 | Wolf et al. | 198/812 |
| 2012/0090957 | A1 * | 4/2012 | Byrne et al. | 198/594 |

* cited by examiner

*Primary Examiner* — James R Bidwell (57) ABSTRACT

Communications systems and methods for transmitting extendible conveyor control signals along an extendible conveyor. A conveyor communication system includes a first transceiver for use on a stationary boom of an extendible conveyor system, configured to communicate with a conveyor main control of the extendible conveyor system. The conveyor communication system includes a second transceiver for use at an end boom of the extendible conveyor system, configured to communicate with a control station on the end boom. The second transceiver is configured to receive wireless communications from the first transceiver over a wireless communications link.

20 Claims, 5 Drawing Sheets

EXTENDIBLE CONVEYOR SYSTEMS AND METHODS

CROSS-REFERENCE TO OTHER APPLICATION

This application claims the benefit of the filing date of U.S. Provisional Patent Application 61/419,385, filed Dec. 3, 2010, which is hereby incorporated by reference.

TECHNICAL FIELD

The present disclosure is directed, in general, to systems and methods for conveyor systems, including extendible conveyors.

BACKGROUND OF THE DISCLOSURE

Conveyor systems, including extendible conveyors, are used for transporting baggage, packages, and other items. Improved systems are desirable.

SUMMARY OF THE DISCLOSURE

Various disclosed embodiments include communications systems and methods for transmitting extendible conveyor control signals along an extendible conveyor. A conveyor communication system includes a first transceiver for use on a stationary boom of an extendible conveyor system, configured to communicate with a conveyor main control of the extendible conveyor system. The conveyor communication system includes a second transceiver for use at an end boom of the extendible conveyor system, configured to communicate with a control station on the end boom. The second transceiver is configured to receive wireless communications from the first transceiver over a wireless communications link.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure, Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Conventional extendible conveyors generally consist of a single stationary boom, such as attached to a loading dock, and one or more mobile booms that extend from the stationary boom. The mobile booms are generally of different sizes, from largest near the stationary boom to smallest at the far end, so that they can nest together when not extended. A main control panel is generally located at the rear end of the stationary boom, while one or more control stations and a safety bumper are located at the front end of the smallest mobile boom.

In most conventional systems, a main cable is used to connect the main control panel and the control station(s) by a cable revving system. The main cable serves as a power delivery and communication channel between the main control panel and the control stations, while the cable revving system routs the main cable through the booms.

Current cable revving systems present significant limitations and drawbacks. For example, due to space constraints, the number of conductors in the main cable is limited. The main cable is laid out alongside major moving components, and so is easily damaged and causes safety concerns. The material and installation costs of the revving system is high, and onsite maintenance costs are also high.

Disclosed embodiments provide significant technical advantages by eliminating the cable revving system and the main cable from the extendible conveyors.

Various disclosed embodiments provide significant improvements in an extendible conveyor. Specifically, various embodiments include a communication system for transmitting extendible conveyor control signals along an extendible conveyor. Various embodiments include a wireless transmitter disposed at a first section of the extendible conveyor for transmitting control signals and a wireless receiver disposed at a second section of the extendible conveyor for receiving control signals from the wireless transmitter. Various embodiments include a power generator for supplying power to one or more of the wireless transmitters.

According to disclosed embodiments, the power generator can be operated by an extending belt that extends the sections of the extendible conveyor or by another moving belt on the extendible conveyor. In another embodiment, the power generator may include a converter for converting at least a portion of the wireless signal into the power, In various embodiments, the wireless transmitter and wireless transceiver may be operated by infrared or radio frequency signals, and some embodiments can include one or more repeaters disposed along at least one of the sections.

Figure 1:
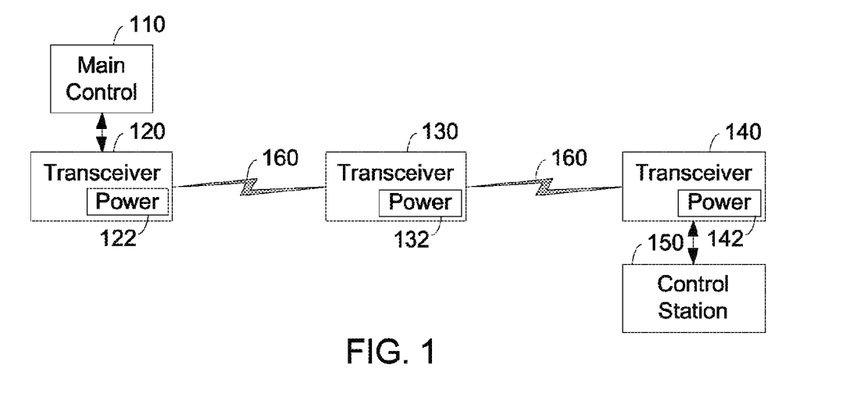
FIG. 1 illustrates a conveyor communication system in accordance with disclosed embodiments.

In some embodiments, the communication system can include a first electrically conductive track associated with a first section of the extendible conveyor and a second electrically conductive track, associated with a second section of the extendible conveyor, that is in electrical communication with the first track on the first section so that electrical signals propagate along the track from one section to another without the need of separate wiring. The electrical signals may comprise electrical power. In other embodiments, the electrical power is generated by a power generator associated with an extending belt for extending the sections of the conveyor, FIG. 1 illustrates a conveyor communication system in accordance with disclosed embodiments. The communication system includes a first transceiver 120 for use on a stationary boom of an extendible conveyor system, configured to communicate with a conveyor main control 110, such as a main control panel on the stationary boom. Transceiver power 122 can be powered by the power mains. In some cases, first transceiver 120 can be integrated with conveyor main control 110, The stationary boom, in various embodiments, can be a boom attached as a fixture to a loading dock, or can be, for example, a boom attached to a truck or other vehicle. Stationary, in some embodiments, refers to the boom from which the other booms extend during operation, and does not necessarily require that the stationary boom not be movable at all.

First transceiver 120 communicates with a second transceiver 140, which is typically located at the end boom of the extendible conveyor system. The end boom refers to the boom furthest from the stationary boom, and is also typically the smallest extendible boom. Second transceiver is powered by transceiver power 142, in one or more of the ways described herein. Second transceiver 140 is configured to communicate with a control station 150 on the end boom. In some embodiments, second transceiver 140 can be integrated with the control station 150.

First transceiver 120 communicates with second transceiver 140 over one or more wireless communication links 160, and can optionally also communicate with one or more intermediate transceivers 130. Intermediate transceivers 130, when implemented, are powered by transceiver power 132, and can act as repeaters between first transceiver 120 and second transceiver 140, receiving and retransmitting data passing between them.

In various embodiments, and as described herein, wireless communication links 160 can be radio-frequency (RE) communications, infrared light (IR) communications, or can be communications along conductive tracks. The wireless communication links 160 can carry data and control signals between the various transceivers described herein, including control signals for the conveyor system such as from the main control to the control station, audio or video data to allow users to communicate between conveyor main control 110 and control station 150, direct power in track implementations, or RF energy for conversion to power. Note also that while transceivers are described herein for particular use in embodiments that transmit/receive data in both directions, simpler embodiments can use a transmitter in place of first transceiver 120 and a receiver in place of second transceiver 140.

Transceiver power 142 and transceiver power 132 can be implemented in a number of ways in various embodiments. For example these power sources can include a power storage device such as a rechargeable battery or capacitor. These power sources can include a charger circuit to charge the power storage device and otherwise maintain the power storage device charge. These power sources can also include a power generating device, such as a power-generating roller that generates power from being driven by the belt on the respective conveyor, or can employ energy harvesting from RF signals.

FIGS. 2-5 depict examples of conveyor communication systems as disclosed and implemented on a conveyor system. Various elements as described above with regard to FIG. 1 are depicted in these figures as well. Descriptions are not necessarily repeated in each figure where an element has been previously described.

Figure 2:
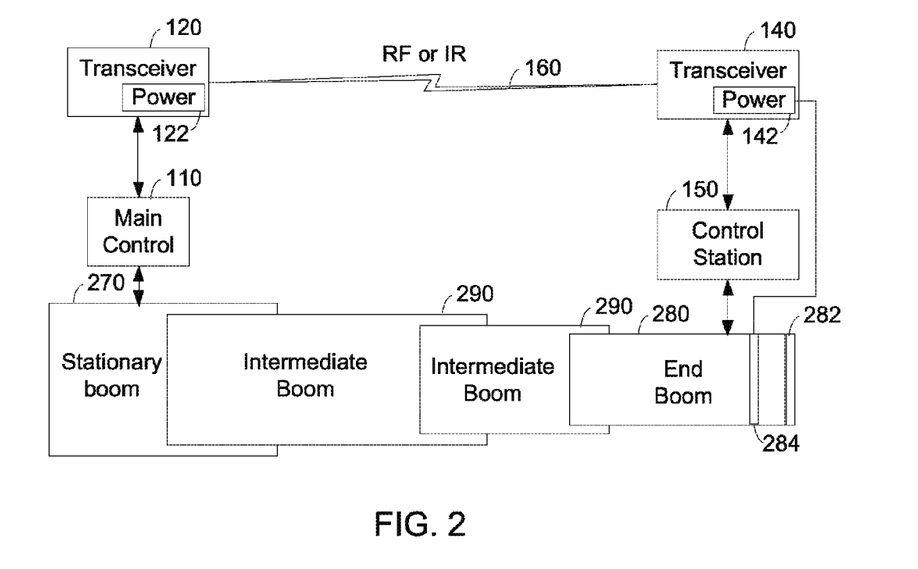
FIGS. 2-5 depict examples of conveyor communication systems as disclosed and implemented on a conveyor system.

FIG. 2 shows an extendible boom conveyor that includes a stationary boom 270 and an end boom 280, and that can have one or more intermediate booms 290. Each boom includes a conveyor belt and other components known to those of skill in the art, and so are not shown in these figures. End boom 280 can include a safety bumper 282 that can communicate with control station 150.

Main control 110 can be connected to, mounted on, or otherwise in control of stationary boom 270. Control station 150 can be connected to, mounted on, or otherwise in control of end boom 280. Using the techniques described herein, main control 110 can control some or all operations of the various booms, control stations, and other elements of the conveyor systems described herein.

In the example of FIG. 2, transceiver power 142 includes a rechargeable battery or capacitor and includes a power-generating roller 284 that generates power from being driven by the belt on end boom 280. The electricity generated by power-generating roller 284 can power sensors, control stations such as control station 150, the safety bumper 282, or other elements, and can charge the rechargeable battery or capacitor.

In this example, the wireless communication link 160 is RE or IR communications, depending on the requirements of the implementation. Of course, in IR implementations, there must be a line-of-sight between transceiver 120 and transceiver 140, or between each of those and any intermediate transceivers 130.

Figure 3:
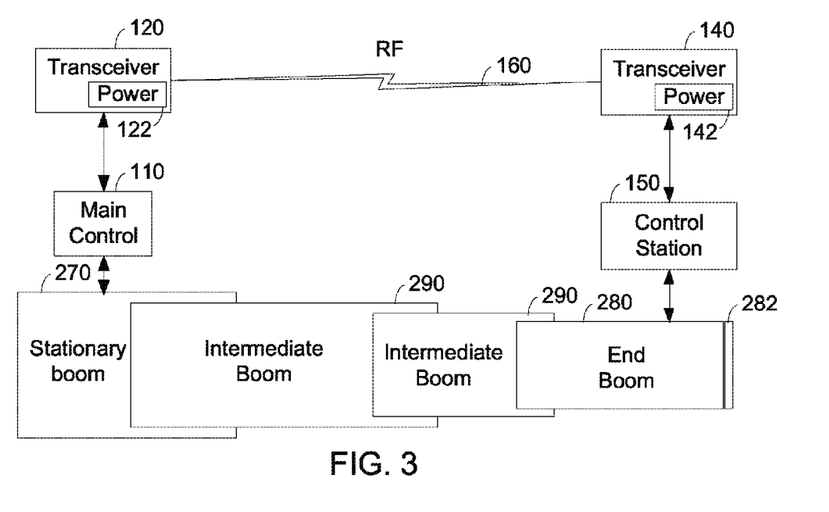

FIG. 3 shows another example of an extendible boom conveyor in accordance with disclosed embodiments. In this example, transceiver power 142 includes a rechargeable battery or capacitor. Transceiver 120 transmits RE data and energy over communication. link 160, and transceiver power 142 includes circuitry that harvests the RF energy and generates electricity to power sensors, control stations such as control station 150, the safety bumper 282, or other elements, and to charge the rechargeable battery or capacitor. Transceiver power 142 can be located at the transceiver, at the control station 150, or otherwise, so that it receives and delivers power as described.

Figure 4:
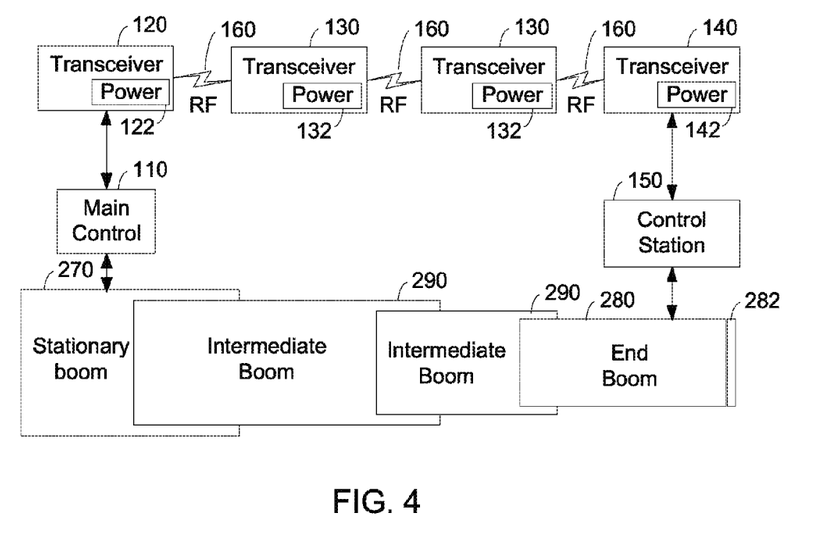

FIG. 4 shows another example of an extendible boom conveyor in accordance with disclosed embodiments. In this example, low-power RF communication links 160 are used to reduce the amount of RF diverge from the booms. One or more intermediate transceivers 130, with transceiver powers 132, are used to relay the RE signal between the transceiver 120 and transceiver 140. Each of the intermediate transceivers 130 can be associated with an intermediate boom 290. Additionally, each intermediate transceiver 130 or intermediate boom 290 can be associated with a respective control station 150 (not shown).

Figure 5:
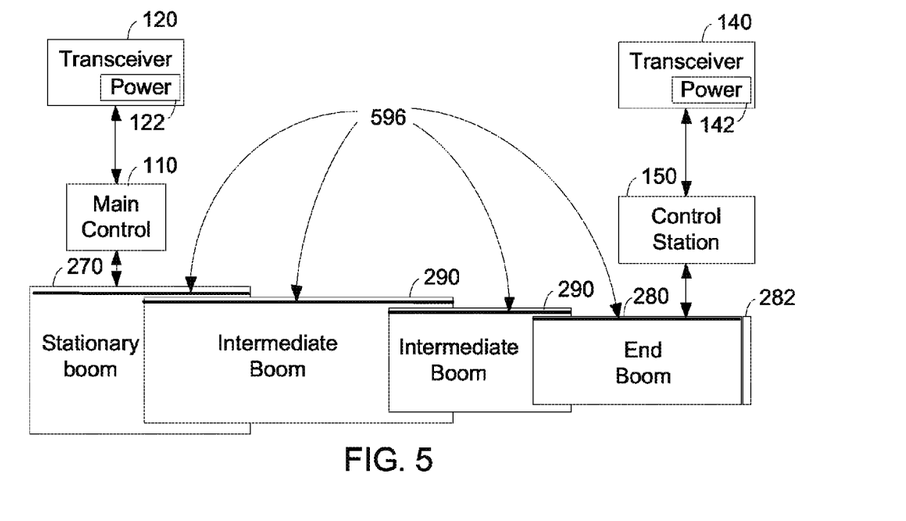

FIG. 5 shows another example of an extendible boom conveyor in accordance with disclosed embodiments. in this example, wireless communication link 160 is implemented using electrically-conductive tracks 596 installed on each of the booms. Power, control signals, or other data are transferred through these tracks to power sensors, control stations such as control station 150, the safety bumper 282, or other elements, and to charge any rechargeable battery or capacitor. Tracks 596 can have multiple conductors as necessary to communicate required data and power.

The control signal is induced and communicated along and between each of the tracks 596. In some embodiments, each track 596 on each boom can include a circuit to regenerate and re-transmit the signal down the tracks to the next boom. Tracks 596 on each boom can remain in electrical communication with each other as the booms are extended and retracted.

Figure 6A:
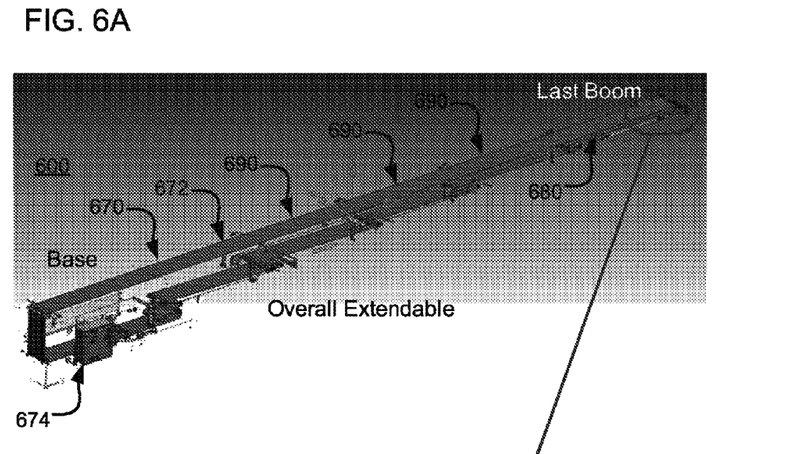
FIG. 6A shows an extendible conveyor in accordance with disclosed embodiments.
Figure 6B:
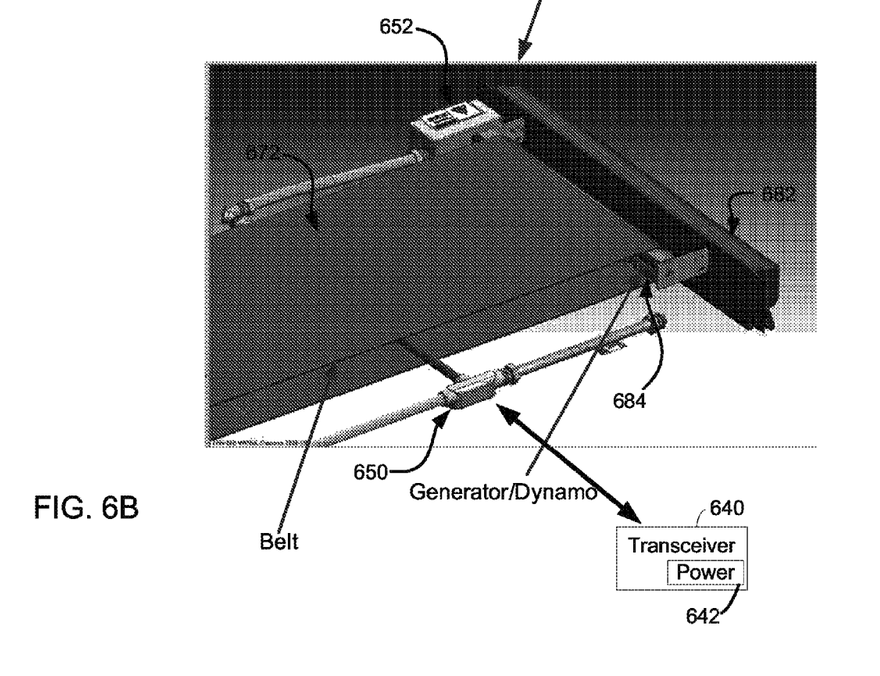
FIG. 6B shows a more detailed view of an end boom of the extendible conveyor of FIG. 6A, in accordance with disclosed embodiments.

FIGS. 6A and 6B depict a more detailed view of an extendible conveyor implementation that illustrates end-boom power generation in accordance with disclosed embodiments.

FIG. 6A shows an extendible conveyor 600, including a stationary boom 670 and an end boom 680, with multiple intermediate booms 690. Note that this implementation provides a single conveyor belt 672 that loops between end boom 680, intermediate booms 690, and stationary boom 670. Belt 672 is driven by drive mechanism 674, in a manner known to those of skill in the art. Since it is located at the stationary boom 670, drive mechanism 674 can be connected to power mains for power. Disclosed embodiments provide power generation at the end boom.

FIG. 6B shows a more detailed view of end boom 680 of extendible conveyor 600. This figure shows safety bumper 682 and power-generating roller 684 that generates electric power from being driven by the belt 672 on end boom 680. This figure also illustrates operator control 652; in a typical implementation, there would also be another operator control on the opposite side of belt 672, but the second operator control is omitted from this example to show the underlying components.

Power-generating roller 684 can include, in some embodiments, a dynamo for generating power as it turns. In operation, belt 672 has tension on power-generating roller 684 so that when the belt moves, the dynamo in power-generating roller 684 generates power. A high-friction roller can be used as power-generating roller 684 to increase the performance of the power generation. The power generated from power-generating roller 684 can then be used to power the control station 650, safety bumper 682, any sensors, any transceivers, or other devices at end boom 680, including transceiver 640 and transceiver power 642, also referred to as the end-boom power supply. Power-generating roller 684 can also charge any batteries or capacitors as described herein. Control station 650, in this example, is physically located in the illustrated junction box, but could be mounted anywhere on end boom 680, connected to operate as described herein.

Transceiver power 642 can include one or more capacitors or batteries, and can include charging circuitry charge the capacitors or batteries. When these batteries or capacitors are fully charged, the charging circuitry can switch to trickle mode to maintain the charge so that the batteries or capacitors will not be over charged. The charging circuitry can also calculate the remaining capacity and health of the batteries or capacitors, and deliver this information to control station 650 or to a main control such as main control 110 described above. These controls can indicate to operator when it is time to change the batteries or capacitors.

Control station 640 and transceiver power 642 can include power-conserving features such as the ability to move to a low-power "sleep" mode when there is no activity for a predetermined time and to wake up immediately when there is information to communicate with the first transceiver or main control. In such a sleep mode, the control station 650, by the transceiver 640, can maintain a "heart beat" communication with the first transceiver main control to update the first transceiver or main control with information that the control station or transceiver 640 is in good health or condition and to identify itself.

Since the transceiver 640 communicates wirelessly, the various transceivers described herein can implement functions to ensure that the appropriate transceivers are communicating with each other. For example, each transceiver may have unique DIP switches for setting up specific identifications or communication channels. Using such techniques, each set of transceivers can be configured to only communicate with other transceivers on the same extendible conveyor.

Figure 7:
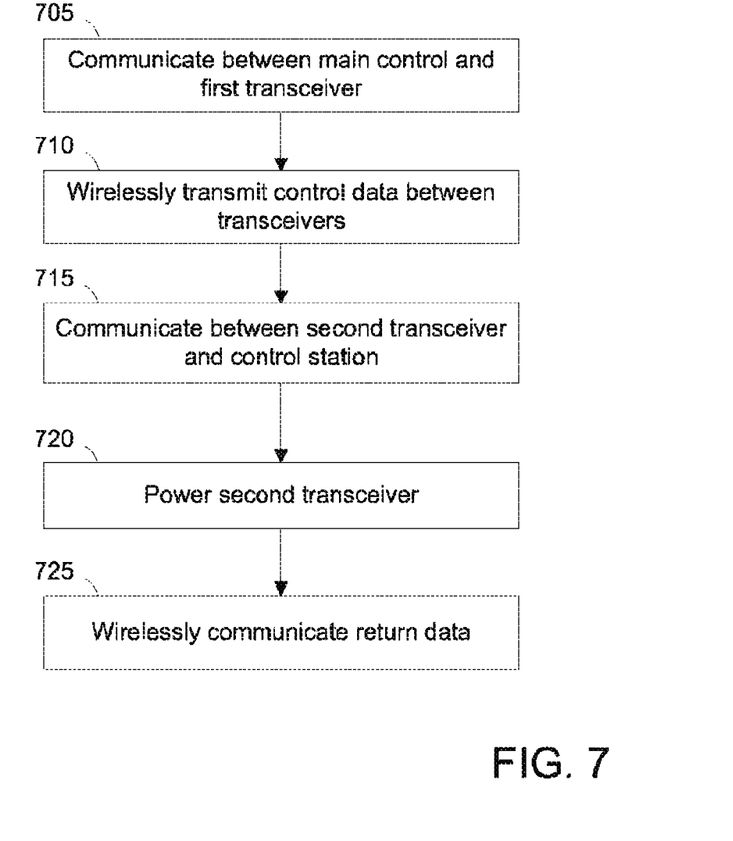
FIG. 7 depicts a flowchart of a process in accordance with disclosed embodiments.

FIG. 7 depicts a flowchart of a process in accordance with disclosed embodiments that can be performed by a conveyor communication system ("the system") as disclosed herein.

The system communicates control data between a first transceiver and a main control of an extendible conveyor (step 705). The main control can be on a stationary boom of an extendible conveyor system.

The system wirelessly transmits the control data between the first transceiver and a second transceiver (step 710).

The system communicates the control data between the second transceiver and a control station (step 715). The control station can be on an end boom of the extendible conveyor system.

The system can power the second transceiver using a power-generating roller driven by a belt on the extendible conveyor (step 720).

The system can wirelessly communicate return data from the control station to the main control via wireless communications between the second transceiver and the first transceiver (step 725).

Various disclosed embodiments therefore include a communication system for transmitting extendible conveyor control signals along an extendible conveyor. The communication system can include a wireless transmitter disposed at a first section of the extendible conveyor for transmitting control signals and a wireless receiver disposed at a second section of the extendible conveyor for receiving control signals from the wireless transmitter. The communication system can include a power generator for supplying power to the wireless transmitter.

In some embodiments, the power generator is operated by an extending belt that extends the sections of the extendible conveyor or by another belt operated by the conveyor. In some embodiments, the power generator comprises a converter for converting at least a portion of the wireless signal into the power. In some embodiments, the wireless transmitter and wireless transceiver are operated by infrared or radio frequency signals. In some embodiments, the wireless transmitter comprises a plurality of repeaters disposed along at least one of the sections.

Various disclosed embodiments also include a communication system for transmitting extendible conveyor control signals along an extendible conveyor. Such a system can include a first electrically conductive track associated with a first section of the extendible conveyor; and second electrically conductive track associated with a second section of the extendible conveyor in electrical communication with the first track on the second section so that electrical signals propagate along the track from one section to another without using separate wiring for these communications. In some embodiments, the electrical signals comprise electrical power.

Those skilled in the art will recognize that, for simplicity and clarity, the full structure and operation of all data processing systems suitable for use with the present disclosure is not being depicted or described herein. Instead, only so much of a conveyor system as is unique to the present disclosure or necessary for an understanding of the present disclosure is depicted and described. The remainder of the construction and operation of the disclosed conveyor systems and communication systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A conveyor communication system, comprising:
a first transceiver for use on a stationary boom of an extendible conveyor system, configured to communicate with a conveyor main control of the extendible conveyor system; and
a second transceiver for use at an end boom of the extendible conveyor system, configured to communicate with a control station on the end boom, wherein the second transceiver is configured to receive wireless communications from the first transceiver over a wireless communications link.

2. The conveyor communication system of claim 1, wherein the wireless communication link is one of a radio-frequency communication link, an infrared light communication link, or over electrically conductive tracks on at least the stationary boom and the end boom.

3. The conveyor communication system of claim 1, further comprising a transceiver power source connected to supply power to the second transceiver.

4. The conveyor communication system of claim 3, wherein the transceiver power source includes a rechargeable battery.

5. The conveyor communication system of claim 3, wherein the transceiver power source includes a power-generating roller configured to generate electric power when driven by a belt on the end boom.

6. The conveyor communication system of claim 3, wherein the transceiver power source includes circuitry that harvests RF energy and generates electricity.

7. An extendible conveyor system, comprising:
a stationary boom;
a conveyor main control associated with the stationary boom;
a first transceiver associated with the stationary boom, configured to communicate with the conveyor main control;
an end boom that extends from the stationary boom;
a control station associated with the end boom;
a second transceiver associated with the end boom, configured to communicate with the control station, wherein the second transceiver is configured to receive wireless communications from the first transceiver over a wireless communications link.

8. The extendible conveyor system of claim 7, wherein the wireless communication link is one of a radio-frequency communication link or an infrared light communication link.

9. The extendible conveyor system of claim 7, further comprising a transceiver power source connected to supply power to the second transceiver, the transceiver power source including a power-generating roller configured to generate electric power when driven by a belt on the end boom.

10. The extendible conveyor system of claim 7, further comprising a transceiver power source connected to supply power to the second transceiver, the transceiver power source including circuitry that harvests RF energy and generates electricity.

11. A method for use with an extendible conveyor system, comprising:
communicating control data between a first transceiver and a main control associated with a stationary boom of the extendible conveyor system;
wirelessly transmitting the control data between the first transceiver and a second transceiver;
communicating the control data between the second transceiver and a control station associated with an end boom of the extendible conveyor system; and powering the second transceiver using a power-generating roller driven by a belt on the extendible conveyor system.

12. The method of claim 11, wherein the wireless transmission is a radio-frequency transmission.

13. The method of claim 11, wherein the wireless transmission is an infrared light transmission.

14. An extendible conveyor system, comprising:
a stationary boom and a first transceiver associated with the stationary boom;
an end boom that extends from the stationary boom and a second transceiver that is associated with the end boom and is configured to communicate with the first transceiver;
a driven belt on the end boom;
a power-generating roller configured to generate electric power from being driven by the driven belt; and
an end-boom power supply configured to receive the electric power from the power-generating roller.

15. The extendible conveyor system of claim 14, wherein the power-generating roller includes a dynamo that generates the electric power as the power-generating roller is turned by the driven belt.

16. The extendible conveyor system of claim 14, wherein the end-boom power supply supplies power to the second transceiver.

17. The extendible conveyor system of claim 14, wherein the end-boom power supply includes a rechargeable battery configured to be charged by the electric power.

18. The extendible conveyor system of claim 14, wherein the end-boom power supply includes charging circuitry configured to charge a rechargeable battery using the electric power, wherein the charging circuitry can operate in a trickle mode to maintain a charge of the rechargeable battery without overcharging the rechargeable battery.

19. The extendible conveyor system of claim 14, wherein the end-boom power supply can operate in a low-power "sleep" mode when there is no activity for a predetermined time and can wake up immediately when there is information to communicate with the first transceiver.

20. The extendible conveyor system of claim 14, wherein the end-boom power supply can operate in a low-power "sleep" mode and the second transceiver can maintain a heart beat communication with the first transceiver including information regarding the health, condition, or identity of the second transceiver.

* * * * *